(12) United States Patent
Grogg et al.

(10) Patent No.: US 10,190,441 B2
(45) Date of Patent: Jan. 29, 2019

(54) TRIPLE FLANGE ARRANGEMENT FOR A GAS TURBINE ENGINE

(71) Applicant: UNITED TECHNOLOGIES CORPORATION, Hartford, CT (US)

(72) Inventors: Gary L Grogg, South Berwick, ME (US); James L McClellan, IV, Kennebunk, ME (US); Garth J Vdoviak, Jr., North Berwick, ME (US)

(73) Assignee: United Technologies Corporation, Farmington, CT (US)

( * ) Notice: Subject to any disclaimer, the term of this patent is extended or adjusted under 35 U.S.C. 154(b) by 389 days.

(21) Appl. No.: 14/773,865

(22) PCT Filed: Mar. 14, 2014

(86) PCT No.: PCT/US2014/026963
§ 371 (c)(1),
(2) Date: Sep. 9, 2015

(87) PCT Pub. No.: WO2014/152111
PCT Pub. Date: Sep. 25, 2014

(65) Prior Publication Data
US 2016/0032780 A1    Feb. 4, 2016

Related U.S. Application Data

(60) Provisional application No. 61/783,271, filed on Mar. 14, 2013.

(51) Int. Cl.
*F01D 25/28* (2006.01)
*F01D 25/16* (2006.01)
(Continued)

(52) U.S. Cl.
CPC ............ *F01D 25/28* (2013.01); *F01D 25/162* (2013.01); *F01D 25/30* (2013.01); *F02C 7/20* (2013.01);
(Continued)

(58) Field of Classification Search
CPC ........ F01D 25/28; F01D 25/162; F01D 25/30; F02C 7/20; F02C 7/28; F05D 2220/32;
(Continued)

(56) References Cited

U.S. PATENT DOCUMENTS 4,074,914 A    2/1978  Novotny
5,433,584 A    7/1995  Amin et al.
(Continued)

FOREIGN PATENT DOCUMENTS

WO    2014164189 A1    10/2014

OTHER PUBLICATIONS

European Extended Search Report dated Oct. 13, 2016, issued in the corresponding European Patent Application No. 14769860.9.
(Continued)

*Primary Examiner* — Phutthiwat Wongwian
*Assistant Examiner* — Kelsey Stanek
(74) *Attorney, Agent, or Firm* — Bachman & LaPointe, P.C.

(57) ABSTRACT

A flange arrangement for a gas turbine engine includes a case flange between a forward flange and an aft flange.

18 Claims, 4 Drawing Sheets

(51) Int. Cl.
  *F02C 7/20* (2006.01)
  *F01D 25/30* (2006.01)
  *F02C 7/28* (2006.01)

(52) U.S. Cl.
  CPC ............ *F02C 7/28* (2013.01); *F05D 2220/32* (2013.01); *F05D 2230/60* (2013.01); *F05D 2240/50* (2013.01); *F05D 2260/36* (2013.01)

(58) Field of Classification Search
  CPC ............ F05D 2230/60; F05D 2240/50; F05D 2260/36
  USPC ............................................... 415/177, 182.1
  See application file for complete search history.

(56) References Cited

U.S. PATENT DOCUMENTS

| | | | | |
|---|---|---|---|---|
| 7,040,098 | B2* | 5/2006 | Lepretre | F01D 11/005 415/214.1 |
| 2003/0097844 | A1 | 5/2003 | Seda | |
| 2004/0063504 | A1 | 4/2004 | Bouchy et al. | |
| 2006/0110244 | A1 | 5/2006 | Brault et al. | |
| 2012/0213629 | A1* | 8/2012 | Rouesne | F01D 25/164 415/170.1 |
| 2012/0297790 | A1 | 11/2012 | Alvanos et al. | |

OTHER PUBLICATIONS

European Office Action dated Apr. 5, 2018, issued in the corresponding European Patent Application No. 14769860.9.

* cited by examiner

TRIPLE FLANGE ARRANGEMENT FOR A GAS TURBINE ENGINE

This application claims priority to U.S. Patent Application Ser. No. 61/783,271 filed Mar. 14, 2013.

BACKGROUND

The present disclosure relates to a gas turbine engine and, more particularly, to a flange arrangement for a case structure thereof.

One purpose of a gas turbine engine turbine exhaust case (TEC) is to support a bearing compartment and the bearings contained therein that rotatably support the engine shafts. Typically, the TEC includes a plurality of hollow struts which support a pair of concentric rings relative to each other. The rings define inner and outer boundaries of the engine gas path while the struts are disposed across the gas path. Tie rods support the bearing housing and pass through the hollow struts to interconnect an engine mount ring and the bearing compartment.

In some engine architectures, a two-bearing compartment locates a TEC case flange F1 adjacent to two bearing supports flanges F2, F3 to facilitate access to the bearing compartment without removal of the TEC case (FIG. 1). The case flange F1 wraps around the bearing support flanges F2, F3 which, although effective, may carry extra weight and concentrate low cycle fatigue (LCF) stresses in the case flange F1. One way to reduce these stresses to acceptable levels is to increase the thickness of the case flange F1 but this increases weight.

SUMMARY

A flange arrangement for a gas turbine engine according to one disclosed non-limiting embodiment of the present disclosure includes a forward flange of a forward bearing support; an aft flange of an aft bearing support; and a case flange between the forward flange and the aft flange.

In a further embodiment of the present disclosure, the case flange extends from a turbine exhaust case.

A further embodiment of the present disclosure includes a plurality of fastener assemblies through the case flange, the forward flange and the aft flange.

In a further embodiment of the present disclosure, the plurality of fastener assemblies are captured in the forward flange.

A further embodiment of the present disclosure includes a double pilot snap fit interface between the forward flange, the aft flange, and the case flange.

A further embodiment of the present disclosure includes a first axial extension and a second axial extension from the forward flange which define surfaces that interference fit with a respective axial case flange surface of the case flange and an axial surface of the aft flange.

A further embodiment of the present disclosure includes a seal between the second axial extension and the aft flange.

In a further embodiment of the present disclosure, the forward flange and the aft flange each support a bearing.

A further embodiment of the present disclosure includes a flange of a forward heat shield and a flange of an aft heat shield fastened to the respective forward flange and the aft flange.

A bearing compartment for a gas turbine engine according to another disclosed non-limiting embodiment of the present disclosure includes a forward bearing support; a forward bearing supported by the forward bearing support; an aft bearing support; an aft bearing supported by the aft bearing support; a forward flange of the forward bearing support; an aft flange of the aft bearing support; and a case flange between the forward flange and the aft flange.

In a further embodiment of the present disclosure, the case flange extends from a turbine exhaust case.

A further embodiment of the present disclosure includes a plurality of fastener assemblies through the case flange, the forward flange and the aft flange.

In a further embodiment of the present disclosure, the fastener assemblies are captured in the forward flange.

A further embodiment of the present disclosure includes a double pilot snap fit interface defined between the forward flange, the aft flange and the case flange.

A further embodiment of the present disclosure further includes a first axial extension and a second axial extension from the forward flange which define surfaces that interference fit with a respective axial case flange surface of the case flange and an axial surface of the aft flange.

A method of supporting a first bearing and a second bearing within a case of a gas turbine engine according to another disclosed non-limiting embodiment of the present disclosure includes locating a double pilot snap fit interface between a forward flange, an aft flange and a case flange; and trapping the case flange between the forward flange and the aft flange.

A further embodiment of the present disclosure includes trapping a turbine exhaust case flange between the forward flange and the aft flange.

A further embodiment of the present disclosure includes capturing a plurality of fastener assemblies to the forward flange.

A further embodiment of the present disclosure includes accessing the bearing compartment without removing the forward bearing compartment.

A further embodiment of the present disclosure includes controlling an offset between a first bearing and a second bearing with respect to a case from which the case flange extends at the double pilot snap fit interface.

The foregoing features and elements may be combined in various combinations without exclusivity, unless expressly indicated otherwise. These features and elements as well as the operation of the invention will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 2:
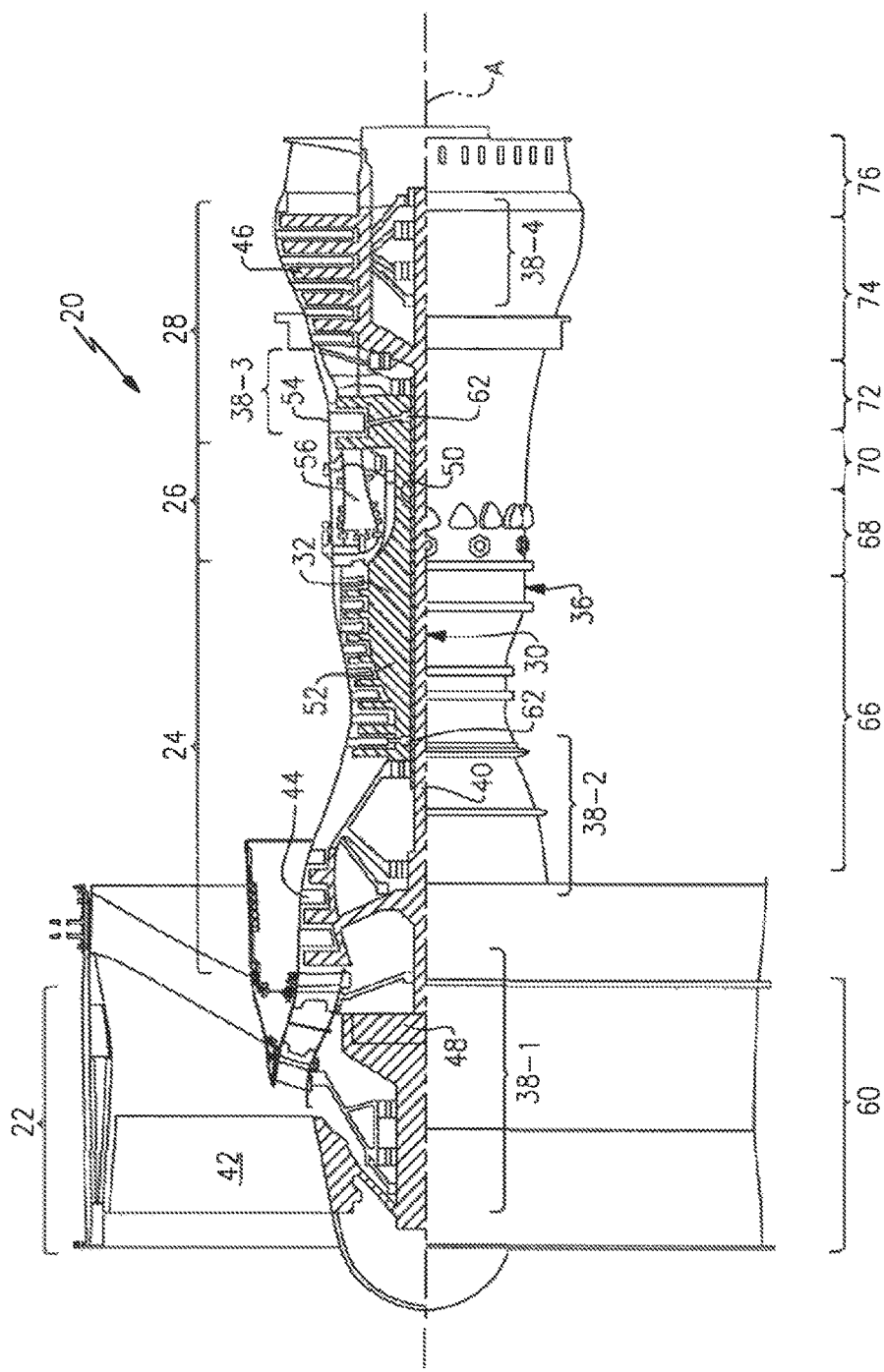
FIG. 2 is a schematic cross-sectional view of a geared architecture gas turbine engine.

FIG. 2 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines architectures such as a low-bypass turbofan may include an augmentor section (not shown) among other systems or features. Although schematically illustrated as a turbofan in the disclosed non-limiting embodiment, it should be understood that the concepts described herein are not limited to use with turbofans as the teachings may be applied to other types of turbine engines to include but not limited to a three-spool (plus fan) engine wherein an intermediate spool includes an intermediate pressure compressor (IPC) between a low pressure compressor and a high pressure compressor with an intermediate pressure turbine (IPT) between a high pressure turbine and a low pressure turbine as well as other engine architectures such as turbojets, turboshafts, open rotors and industrial gas turbines.

The fan section 22 drives air along a bypass flowpath and a core flowpath while the compressor section 24 drives air along the core flowpath for compression and communication into the combustor section 26 then expansion through the turbine section 28. The engine 20 generally includes a low spool 30 and a high spool 32 mounted for rotation about an engine central longitudinal axis A relative to an engine case assembly 36 via several bearing compartments 38.

The low spool 30 generally includes an inner shaft 40 that interconnects a fan 42, a low-pressure compressor 44 ("LPC") and a low-pressure turbine 46 ("LPT"). The inner shaft 40 drives the fan 42 through a geared architecture 48 to drive the fan 42 at a lower speed than the low spool 30. The high spool 32 includes an outer shaft 50 that interconnects a high-pressure compressor 52 ("HPC") and high-pressure turbine 54 ("HPT"). A combustor 56 is arranged between the HPC 52 and the HPT 54. The inner shaft 40 and the outer shaft 50 are concentric and rotate about the engine central longitudinal axis A that is collinear with their longitudinal axes.

Core airflow is compressed by the LPC 44 then the HPC 52, mixed with the fuel and burned in the combustor 56, then expanded over the HPT 54 and the LPT 46. The HPT 54 and the LPT 46 drive the respective low spool 30 and high spool 32 in response to the expansion.

In one example, the gas turbine engine 20 is a high-bypass geared architecture engine in which the bypass ratio is greater than about six (6:1). The geared architecture 48 can include an epicyclic gear system 58, such as a planetary gear system, star gear system or other system. The example epicyclic gear train has a gear reduction ratio of greater than about 2.3, and in another example is greater than about 2.5 with a gear system efficiency greater than approximately 98%. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one non-limiting embodiment, a significant amount of thrust is provided by the bypass flow due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 3:
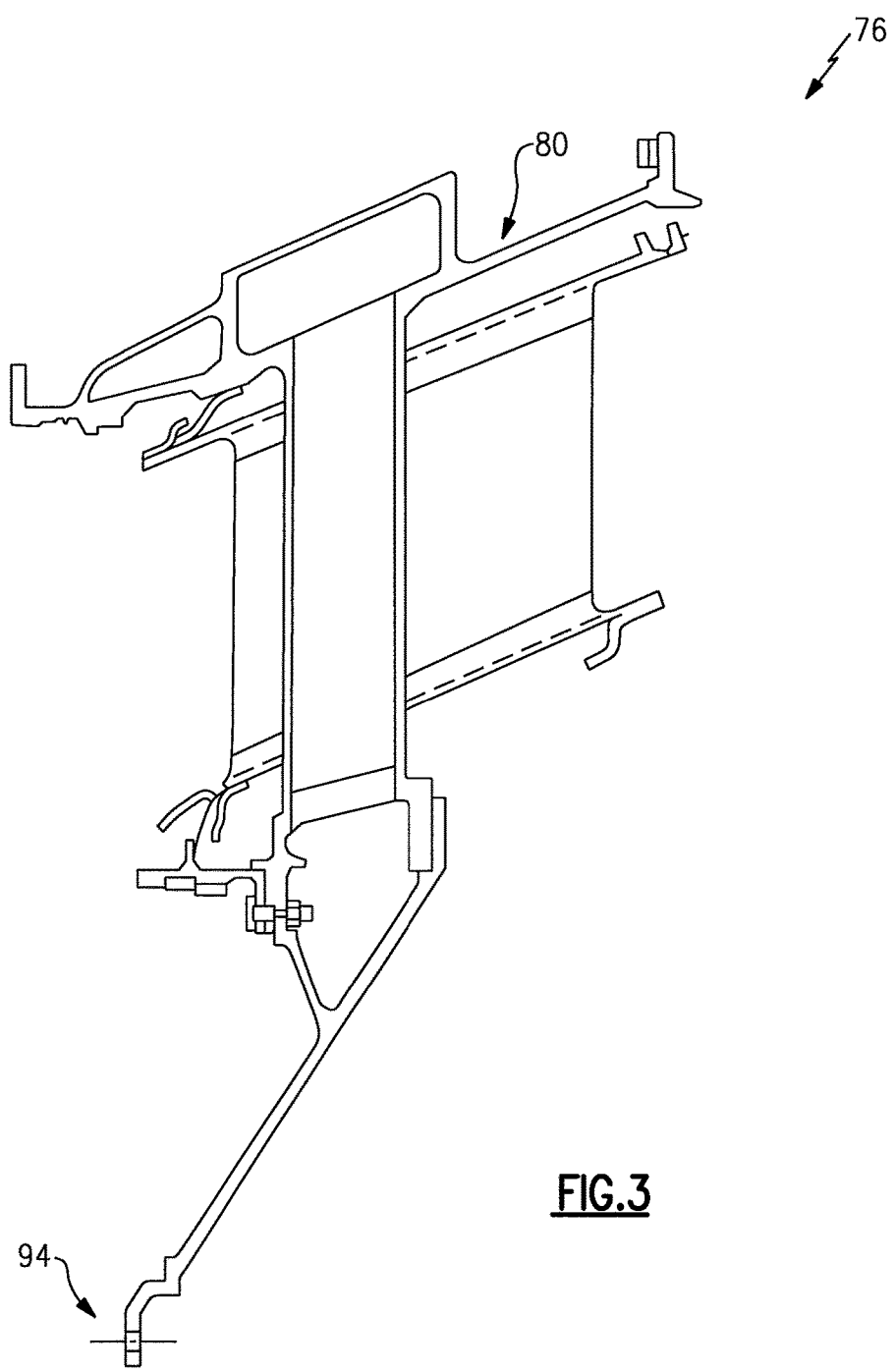
FIG. 3 is a schematic view of a turbine exhaust case module.

The engine case assembly 36 generally includes a plurality of modules to include a fan case module 60, an intermediate case module 62, an LPC module 64, a HPC module 66, a diffuser module 68, a HPT module 70, a mid-turbine frame (MTF) module 72, a LPT module 74, and a Turbine Exhaust Case (TEC) module 76 (FIG. 3). It should be understood that additional or alternative modules might be utilized to form the engine case assembly 36.

The bearing compartments 38 in the disclosed non-limiting embodiment are defined herein as a forward bearing compartment 38-1, a mid-bearing compartment 38-2 axially aft of the forward bearing compartment 38-1, a mid-turbine bearing compartment 38-3 axially aft of the mid-bearing compartment 38-2 and a rear bearing compartment 38-4 axially aft of the mid-turbine bearing compartment 38-3. It should be appreciated that additional or alternative bearing compartments may be provided.

Figure 4:
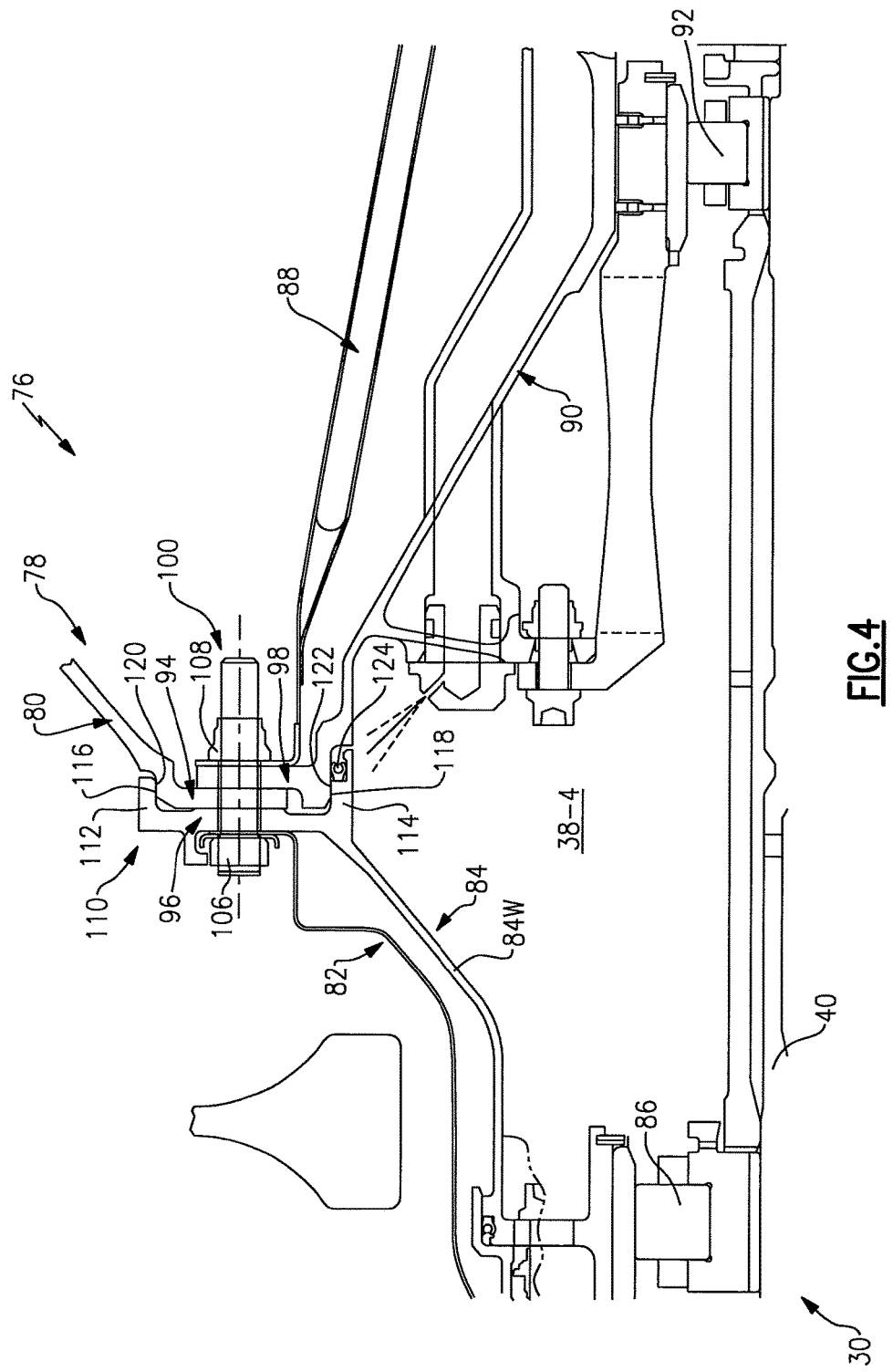
FIG. 4 is an expanded sectional view of a triple flange stack according to the disclosed non-limiting embodiment.

With reference to FIG. 4, the TEC module 76 generally includes a case 80, a forward heat shield 82, a forward bearing support 84, a forward bearing 86, an aft heat shield 88, an aft bearing support 90 and an aft bearing 92. The forward bearing 86 and the aft bearing 92 are, in the disclosed non-limiting embodiment, the #5 and #6 bearing within the rear bearing compartment 38-4 to support the inner shaft 40 of the low spool 30. It should be appreciated, however, that various bearing compartments will benefit herefrom.

A flange stack 78 generally includes a case flange 94 of the case 80 secured between a forward flange 96 of the forward bearing support 84 and an aft flange 98 of the aft bearing support 90 by a fastener assembly 100. This allows the radial loading from the relatively higher-temp case flange 94 to pull on the forward bearing support 84 close to a load line through a conical wall 84W which dramatically reduces the stress in the case flange 94 with relatively thin wall thickness flanges.

A flange 102 of the forward heat shield 82 and a flange 104 of the aft heat shield 88 may also be secured by the fastener assembly 100 that includes, for example, a bolt 106 and a nut 108. The fastener assembly 100 may be a captured fastener assembly in which the bolt 106 is retained to the forward bearing support 84 even when the aft bearing support 90 is removed. It should be appreciated that numerous fastener assemblies 100 may be utilized about the circumference of the circular flanges 94, 96, 98, 102, 104.

A double pilot snap fit interface 110 is defined between the forward flange 96 and the aft flange 98. The double pilot snap fit interface 110 includes a first axial extension 112 and a second axial extension 114 from the forward flange 96 to define respective surfaces 116, 118 that form an interference "snap" fit with a respective axial case flange surface 120 of the case flange 94 and a second axial surface 122 of the aft flange 98. A resilient seal 124 may also be located between the second axial surface 122 of the aft flange 98 and the second axial extension 114 of the forward flange 96.

The double pilot snap fit interface 110 between the forward flange 96 and the aft flange 98 provides an improved load path to both bearings 86, 92. The overall stiffness within the TEC module 76 is also facilitated because of the direct load path through the flanges 94, 96, 98.

The double pilot snap fit interface 110 also shields the high temp case flange 94 from the oil wetted bearing compartment 38-4. Shielding of wetted compartment walls from the relatively high thermal conduction temperatures from the case flange 94 facilitates the prevention of engine oil coking.

An additional benefit of the triple flange stack 78 is that both bearing supports 84, 90 share the double pilot snap fit interface 110 to facilitate concentricity of bearings 86, 92 yet the rear bearing support 90 is readily removed for access and repair of hardware without removal of the forward bearing support 84.

Figure 1:
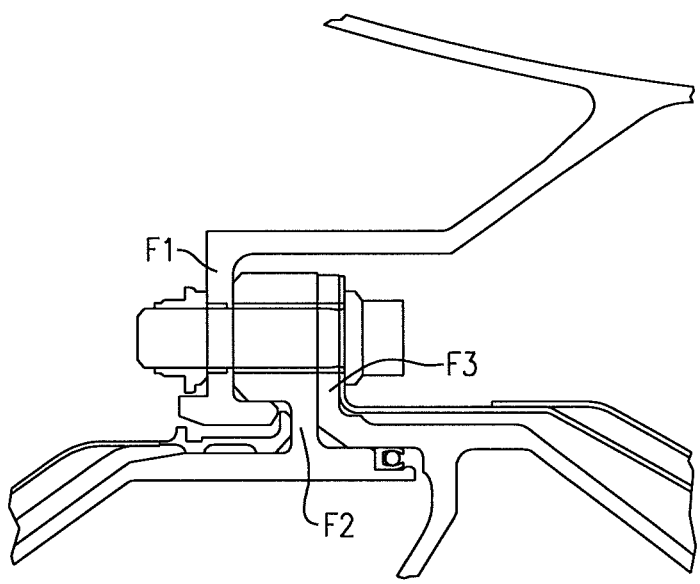
FIG. 1 is an expanded sectional view of a RELATED ART flange stack.

Still additional benefits are that a centerline shift of the shaft 40 can be readily achieved with respect to the bearing compartment 38-4 relative to the case 80 yet maintain normal bolt clearances. The case flange 94 also accommodates a range of centerline shifts as the case flange 94 is sandwiched in the flange stack 78 as compared to conventional architecture (FIG. 1; RELATED ART) that requires offset of the bolt circles of both bearing supports as well as the snap fit.

Other arrangements of a triple flange stack 78 may locate the case flange inside the bearing compartment.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A flange arrangement for a gas turbine engine comprising:
    a forward flange of a forward bearing support;
    an aft flange of an aft bearing support;
    a case flange between said forward flange and said aft flange; and
    a first axial extension and a second axial extension from said forward flange which define surfaces that interference fit with a respective axial case flange surface of said case flange and an axial surface of said aft flange.

2. The flange arrangement as recited in claim 1, wherein said case flange extends from a turbine exhaust case.

3. The flange arrangement as recited in claim 1, further comprising a plurality of fastener assemblies through said case flange, said forward flange and said aft flange.

4. The flange arrangement as recited in claim 3, wherein said plurality of fastener assemblies are captured in said forward flange.

5. The flange arrangement as recited in claim 1, wherein said interference fit is a double pilot snap fit interface between said forward flange, said aft flange, and said case flange.

6. The flange arrangement as recited in claim 1, further comprising a seal between said second axial extension and said aft flange.

7. The flange arrangement as recited in claim 1, wherein said forward flange and said aft flange each support a bearing.

8. A flange arrangement for a gas turbine engine comprising:
    a forward flange of a forward bearing support;
    an aft flange of an aft bearing support;
    a case flange between said forward flange and said aft flange; and
    a flange of a forward heat shield and a flange of an aft heat shield fastened to said respective forward flange and said aft flange.

9. A bearing compartment for a gas turbine engine comprising:
    a forward bearing support;
    a forward bearing supported by said forward bearing support;
    an aft bearing support;
    an aft bearing supported by said aft bearing support;
    a forward flange of said forward bearing support;
    an aft flange of said aft bearing support;
    a case flange between said forward flange and said aft flange; and
    a first axial extension and a second axial extension from said forward flange which define surfaces that interference fit with a respective axial case flange surface of said case flange and an axial surface of said aft flange.

10. The bearing compartment as recited in claim 9, wherein said case flange extends from a turbine exhaust case.

11. The bearing compartment as recited in claim 9, further comprising a plurality of fastener assemblies through said case flange, said forward flange and said aft flange.

12. The bearing compartment as recited in claim 11, wherein said fastener assemblies are captured in said forward flange.

13. The bearing compartment as recited in claim 12, wherein said interference fit is a double pilot snap fit interface defined between said forward flange, said aft flange and said case flange.

14. A method of supporting a first bearing and a second bearing within a case of a gas turbine engine comprising:
locating a double pilot snap fit interface between a forward flange, an aft flange and a case flange, wherein said double pilot snap fit comprises a first axial extension and a second axial extension from said forward flange which define surfaces that interference fit with a respective axial case flange surface of the case flange and an axial surface of said aft flange to trap the case flange between the forward flange and the aft flange.

15. The method as recited in claim 14, wherein the case flange is a turbine exhaust case flange.

16. The method as recited in claim 14, further comprising capturing a plurality of fastener assemblies to the forward flange.

17. The method as recited in claim 16, further comprising accessing the bearing compartment without removing the forward bearing compartment.

18. The method as recited in claim 14, further comprising controlling an offset between a first bearing and a second bearing with respect to a case from which the case flange extends at the double pilot snap fit interface.

* * * * *